(12) United States Patent
Frost

(10) Patent No.: US 8,893,856 B2
(45) Date of Patent: Nov. 25, 2014

(54) GRAVITY SCAVENGED GENERATOR WITH INTEGRAL ENGINE OIL TANK

(75) Inventor: Cristopher Frost, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1494 days.

(21) Appl. No.: 12/179,357

(22) Filed: Jul. 24, 2008

(65) Prior Publication Data

US 2010/0019505 A1 Jan. 28, 2010

(51) Int. Cl.
| | |
|---|---|
| *F01D 25/18* | (2006.01) |
| *F02C 7/06* | (2006.01) |
| *F02G 3/00* | (2006.01) |
| *F02C 7/32* | (2006.01) |
| *B64D 41/00* | (2006.01) |

(52) U.S. Cl.
CPC . *F01D 25/18* (2013.01); *F02C 7/32* (2013.01); *B64D 2041/002* (2013.01); *Y02T 50/671* (2013.01); *F05D 2260/602* (2013.01)
USPC ........................................ 184/6.11; 60/39.08

(58) Field of Classification Search
CPC .................................. F16N 7/02; B60R 17/00
USPC ................. 184/6.11, 65, 6.12; 60/39.08, 802; 415/110
See application file for complete search history.

(56) References Cited

U.S. PATENT DOCUMENTS

| | | | | | |
|---|---|---|---|---|---|
| 1,874,585 | A | * | 8/1932 | Newcomb | 184/106 |
| 2,770,320 | A | * | 11/1956 | Dreznes | 96/341 |
| 2,941,622 | A | * | 6/1960 | Mosley | 184/103.2 |
| 3,666,211 | A | * | 5/1972 | Cathers et al. | 244/54 |
| 4,121,631 | A | * | 10/1978 | Jones | 141/27 |
| 4,446,377 | A | | 5/1984 | Kure-Jensen et al. | |
| 4,669,263 | A | * | 6/1987 | Sugiyama | 60/39.08 |
| 6,244,539 | B1 | * | 6/2001 | Liston et al. | 244/54 |
| 6,580,179 | B2 | * | 6/2003 | Eccles et al. | 290/44 |
| 2003/0155183 | A1 | | 8/2003 | Nonaka et al. | |
| 2006/0056958 | A1 | * | 3/2006 | Gaines et al. | 415/115 |
| 2007/0110599 | A1 | * | 5/2007 | Suss | 417/415 |
| 2007/0209880 | A1 | | 9/2007 | Rollins et al. | |
| 2008/0127774 | A1 | * | 6/2008 | Frost | 74/606 R |
| 2008/0236952 | A1 | * | 10/2008 | Shimizu et al. | 184/6.22 |

* cited by examiner

*Primary Examiner* — Henry Liu
(74) *Attorney, Agent, or Firm* — Shimokaji & Associates, P.C.

(57) ABSTRACT

A generator having an integral oil tank for an auxiliary power unit (APU) is provided. A gas turbine engine has a turbine shaft extending from an aft portion to a forward portion where it is in communication with a gear box mounted thereto. The gearbox advantageously has at least one oil gravity drain passage in flow communication with a lower portion thereof and is suitable for reducing the speed of the turbine shaft by gear reduction to power an oil cooled generator attached thereto. The oil cooled generator has at least one oil gravity drain passage therein. An engine oil tank is integral with and advantageously removable from the generator and is in flow communication with each oil gravity drain passage making is suitable for gravity scavenging oil from the generator and advantageously the gearbox.

16 Claims, 5 Drawing Sheets

GRAVITY SCAVENGED GENERATOR WITH INTEGRAL ENGINE OIL TANK

BACKGROUND OF THE INVENTION

The present invention generally relates to gas turbine engines and, more specifically, to an aircraft Auxiliary Power Unit (APU) with an oil cooled generator having an oil tank integral therewith providing gravity scavenging of oil from the generator.

APUs are generally small gas turbine engines, often mounted in the aft tailcone section of the aircraft with an exhaust directed out of the aft of the tailcone section. The APU typically provides electrical and pneumatic power to the aircraft for main engine starting and passenger compartment cooling. The APU may supply pneumatic and electric power during flight as well as provide emergency power during flight.

A typical APU has a power section with a combustor proximate an aft end and an air compressor proximate a forward end. The combustor receives compressed air from the air compressor and fuel from a fuel supply source in order to generate a high pressure combustion product for rotating a turbine shaft. A gearbox is typically mounted to the forward side of the power section having the air compressor and reduces the rotational speed of the turbine shaft by gear reduction down to the required speed to properly operate the generator and other components mounted to the gearbox. Other components that may be driven by the gearbox may include such components as an air oil separator, oil pump and fuel pump assemblies, and other associated components. A starter may also be mounted to the gearbox for starting the power section. Lubricating and/or cooling oil is typically supplied to components disposed within or associated with the APU such as the gearbox, generator, and power section. Typically, the generator has the greatest demand for such oil since the generator is typically an oil cooled generator requiring oil to cool the stator and other electrical components as well as to lubricate bearings and splines.

Referring to FIGS. 1A and 1B, there is shown an APU 100 of the prior art having an oil tank 108 integral with a gearbox 104. Gearbox 104 is mounted to the cooler end of a turbine engine 106 opposite an exhaust 122. Gearbox 104 typically has a housing 101 comprised of cast aluminum and has a lower portion serving as oil tank 108 where the oil is pumped to the various components of APU 100 and returned thereto. Gearbox 104 has a generator 102 mounted to the forward end thereof, opposite turbine engine 106, and is axially parallel with a turbine shaft substantially extending turbine engine 106 along an engine centerline 120. As shown in FIG. 1B, gearbox 104 has a relatively small depth 103 along engine centerline 120. Therefore, gearbox 104 extends well below and about the gears therein to accommodate the volume of cooling and lubricating oil needed and to minimize oil churning by the gears. APU 100 is typically installed in the tailcone section of an aircraft with exhaust 122 exiting an aft portion of the aft tailcone section.

Due to the location and configuration of generator 102, the cooling and lubricating oil must be mechanically scavenged (pumped against the force of gravity) by an oil pump, shown as a component of an oil and fuel pump assembly 116, and returned to oil tank 108 located in the bottom of gearbox 104. When APU 100 is installed in an aircraft, various flight attitudes of the aircraft complicates the scavenging process and may necessitate the use of separate cored oil passages and pump elements to minimize the risk of oil flooding either side of a generator rotor. Failure to scavenge the oil from the generator rotor may result in excess heat generation and mechanical failure of the generator 102. A mechanically failed generator may contaminate the engine oil system and result in complete failure of the APU 100.

Gearbox 104 has components in addition to generator 102 mounted to the forward side thereof which may also be powered by the power section gearbox 104. These components may include, for example, an air/oil separator 112, a starter 114, and oil pump and fuel pump assembly 116. Additional and different components may be mounted to and powered by gearbox 104.

Gearbox housing 101 is typically comprised of cast aluminum and has a lower portion that serves as oil tank 108 where the oil is pumped to the various components of APU 100 and returned thereto. In order to accommodate this oil, gearbox housing 101 extends well around and below the gears therein to minimize oil pickup by the rotating gears. Generator 102 is typically mounted to the forward side of gearbox 104, opposite a power section having turbine engine 106, and axially aligned with a turbine shaft substantially longitudinally extending the turbine engine 106. Due to the location of generator 102 on the extreme forward and frequently lower end of APU 100, the oil must be mechanically scavenged (pumped against the force of gravity) by the oil pump and returned to oil tank 108, located in the bottom of gearbox 104. Oil needs to be scavenged from both ends of the generator rotor and returned to the oil tank. This requires complex lubrication systems to make it function properly. Failure to collect the oil from both ends of generator 102 can result in oil being churned by the rotor, excess generation of heat, and even catastrophic generator failure. An aircraft in various flight attitudes complicates this scavenging process and may necessitate the use of separate cored oil passages and pump elements to minimize the risk of oil flooding either side of the generator rotor and generator failure. A mechanically failed generator can produce debris. When scavenged by the pump and returned to oil tank 108 the debris can be churned up by the rotating gears during extreme flight attitudes. This debris in the gear train and bearings can result in severe damage and complete failure of APU 100.

In addition to the aforementioned problems associated with current designs of the gearbox having an integral oil tank, other problems have been found. A gearbox with an integral oil tank may limit configurations of components mounted thereto and the locations on the gearbox where they may be mounted to keep the gear train from churning the oil stored in the tank below. These current design practices necessitate high maintenance costs since the entire APU typically must be removed from the aircraft and the gearbox needs to be removed from the APU to enable maintenance and cleaning of the engine oil tank. Also, fire testing of the gearbox may be required to prove it meets the fire proof requirement as aluminum is not recognized as providing a fireproof oil tank. Additionally, the weight and cost of the oil tank may be greater than needed.

As can be seen, there is a need for an APU having a reduced risk of failure, smaller gearbox, lower associated maintenance costs, less weight and cost.

SUMMARY OF THE INVENTION

According to one aspect of the present invention, an APU for an aircraft is provided having an oil cooled generator mounted proximate an end the APU. The oil cooled generator receives power from a power section of the APU and has at least one oil gravity drain passage in flow communication with a lower portion thereof. An engine oil tank having a sidewall, a bottom wall, and an open top, has a portion of the sidewall mounted to the generator. The bottom wall of the oil tank is positioned below the lower portion of the oil cooled generator enabling the oil tank to gravitationally scavenge oil from the at least one oil gravity drain passage in the oil cooled generator.

In another aspect of the present invention, an APU is provided having an oil cooled generator and oil tank assembly. The oil tank extends from a lower portion of the generator wherein the generator receives power from a power section of the APU at a reduced rotational speed. The generator has an oil gravity drain passage in flow communication with each end of a rotor and the oil tank.

In yet another aspect of the present invention, a generator is provided having an oil tank suitable for use with an APU for an aircraft. The generator has a rotor with an oil gravity drain passage in flow communication with at least one end thereof and a lower portion of the generator. An oil tank is removably mounted to the generator and has an open top in flow communication with the oil gravity drain passages enabling it to gravity scavenge oil from the generator during operation thereof.

In further aspect of the present invention, a generator is provided having an oil tank suitable for use with an APU for an aircraft. The generator has a rotor with an oil gravity drain passage in flow communication with at least one end thereof and a lower portion of the generator and a gravity drain passage in flow communication with the power section gearbox. An oil tank is removably mounted to the generator and has an open top in flow communication with the oil gravity drain passages enabling it to gravity scavenge oil from the generator and power section gearbox during operation thereof.

These and other features, aspects and advantages of the present invention will become better understood with reference to the following drawings, description and claims.

DETAILED DESCRIPTION OF THE INVENTION

Figure 1A:
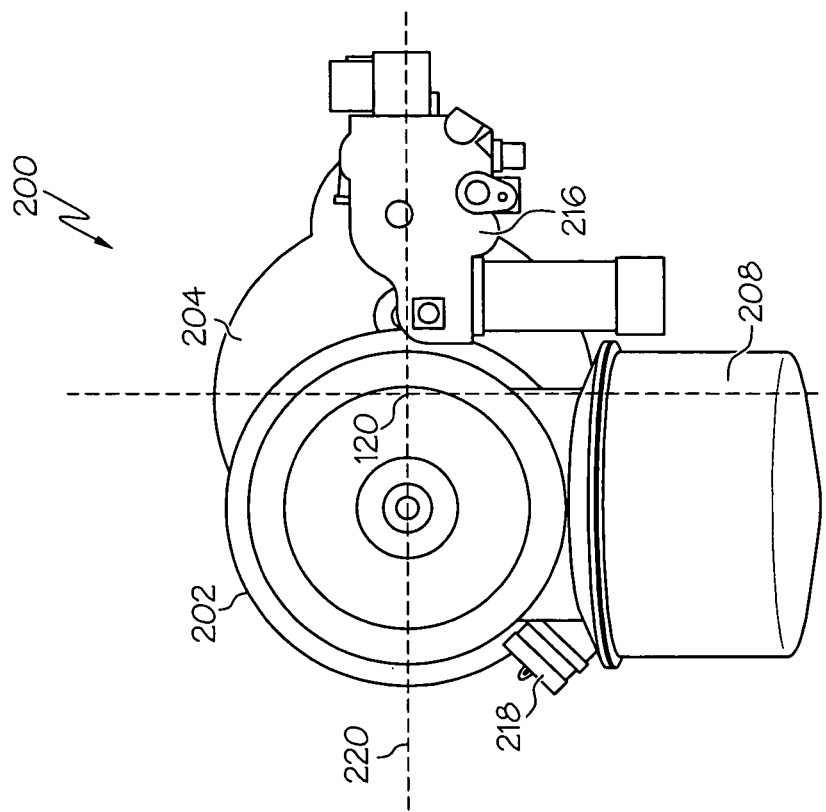
FIG. 1A is a forward end view of an APU of the prior art showing an integral gearbox and oil tank assembly.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

The configuration of the oil tank of the gravity scavenged generator with integral engine oil tank may be better for meeting the various attitude requirements of an aircraft in flight. Prior art designs with the oil tank being located in the bottom of the gearbox results in a tank shape that is shallow in the APU longitudinal direction and wide with the APU width. This shape is not advantageous for aircraft roll angles since oil easily flows out of the tank area and gets churned by the gears in the gearbox. An embodiment of the present invention having a cylindrical deep tank that is not located directly below the geartrain may be more advantageous in handling aircraft attitude (pitch and roll) by keeping more oil in the tank and reducing the amount of oil reaching the rotating gears.

An APU comprises a gravity scavenged generator with integral engine oil tank where the gravity scavenged generator has oil scavenged therefrom with the force of gravity, thereby reducing or even eliminating the requirement to pump scavenge oil from the generator. The gravity scavenged generator with integral engine oil tank gravity scavenges oil from the generator to which it is integral with and typically has a gearbox that is mounted to an aft side thereof. Oil may be scavenged from each end of the generator rotor, thereby reducing the risk of churning of oil by the rotor, generation of excess heat, and generator failure. The gravity scavenged generator with integral engine oil tank simplifies the lubrication system and reduces the risk of accumulating contaminated oil and debris in the gearbox. The gravity scavenged generator with integral oil tank has the ability to drain the oil that collects on either side of the generator rotor by simply gravity scavenging oil straight into engine oil tank. This is accomplished by having the engine oil tank, that is typically housed in the APU gearbox in APU's of the prior art, directly under the generator. Thus, the need to pump scavenge oil from the generator to the oil tank may be eliminated. The elimination of the generator scavenge requirement of the prior art may result in a less complex lubrication system and may eliminate cored passages and scavenge elements from the pump. Advantageously, the forward end of the power section and the gearbox are in flow communication with the engine oil tank providing gravity scavenging from portions of the power section and gearbox.

An APU having the gravity scavenged generator with integral engine oil tank may be less complex, lighter weight, and less costly to produce and maintain. Risk of gear and bearing failure in the gearbox may also be minimized if the generator fails mechanically by having the engine oil tank out of the gearbox, as in the prior art. Rotating gears in the gearbox of the prior art have a tendency to sling the debris from generator failure around in the gearbox. Optionally, a screen may be included between generator gravity discharge ports or oil gravity drain passages and the bottom wall of the integral oil tank to further protect the lubrication system from contamination. Additional advantages of the present invention over the prior art may include the ability to easily drain and remove the engine oil tank from the APU for maintenance or cleaning in the event of mechanical failure of the generator. Prior art APUs may require the entire APU to be removed from the aircraft and the gearbox to be removed from the APU to clean the engine oil tank. The engine oil tank integrated with the generator may be removable from the aircraft without the need to remove the whole APU or the gearbox from the APU.

The APU of the present invention may allow the use of more fire resistant materials. Prior art APUs typically have the engine oil contained in a lower portion of a cast aluminum gearbox tank. Current regulations do not considered aluminum to be a fire proof material and a fire test is required to prove its ability to meet the fire requirement. The engine oil tank integrated under the generator of the present invention allows for the use of fire proof materials such as steel. Additionally, a thin walled steel engine oil tank may be less expensive and lighter weight compare to a cast aluminum tank integral with the cast aluminum gearbox of the prior art.

Generally, the present invention provides an APU with a gravity scavenged generator having an oil tank integral therewith. The generator with an integrated oil tank may provide for an APU having a reduced risk of failure, a smaller gearbox, less required testing, less weight, and/or less cost to manufacture and maintain than the APUs of the prior art. However, even though it is contemplated that the generator having an integral oil tank of the present invention be used in an auxiliary power unit in an aircraft, which is typically installed in the tailcone, other and different applications may be employed and still be within the scope of the claims.

Figure 2A:
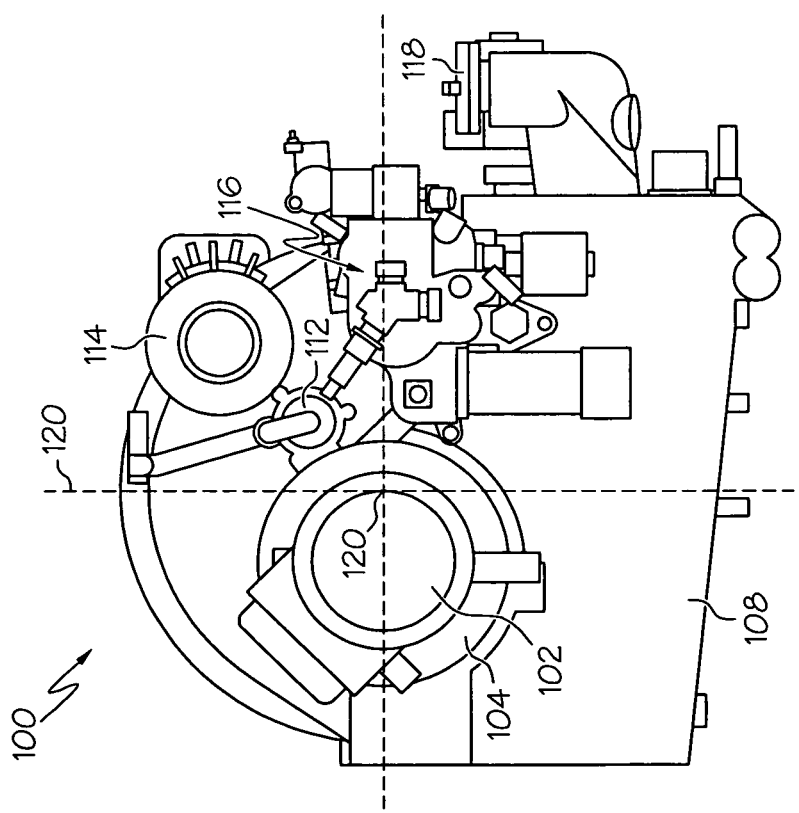
FIG. 2A is a forward end view of an embodiment of an APU of the present invention showing an integral generator and oil tank assembly.
Figure 1B:
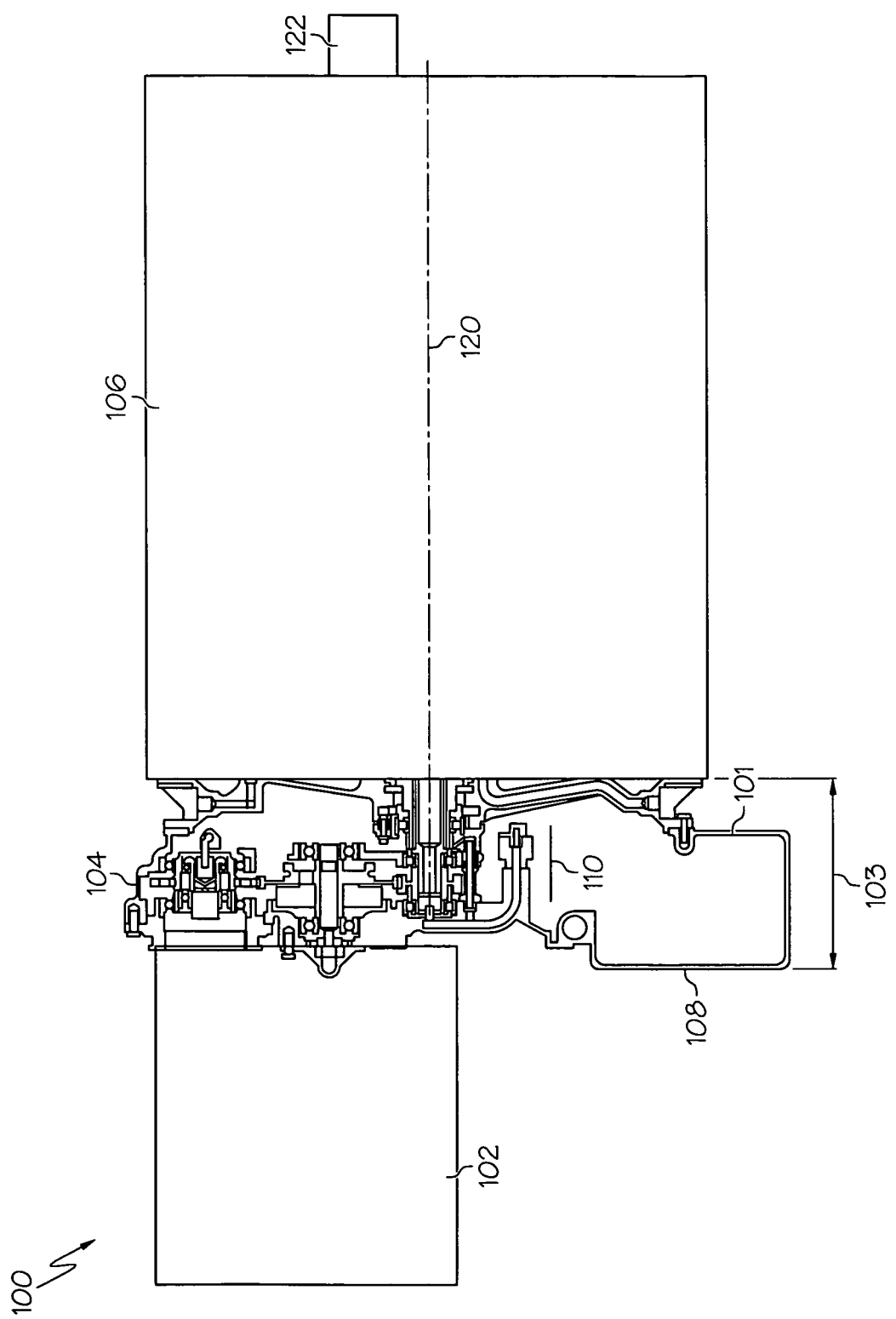
FIG. 1B is a side view of an APU of the prior art showing an integral gearbox and oil tank assembly.
Figure 2B:
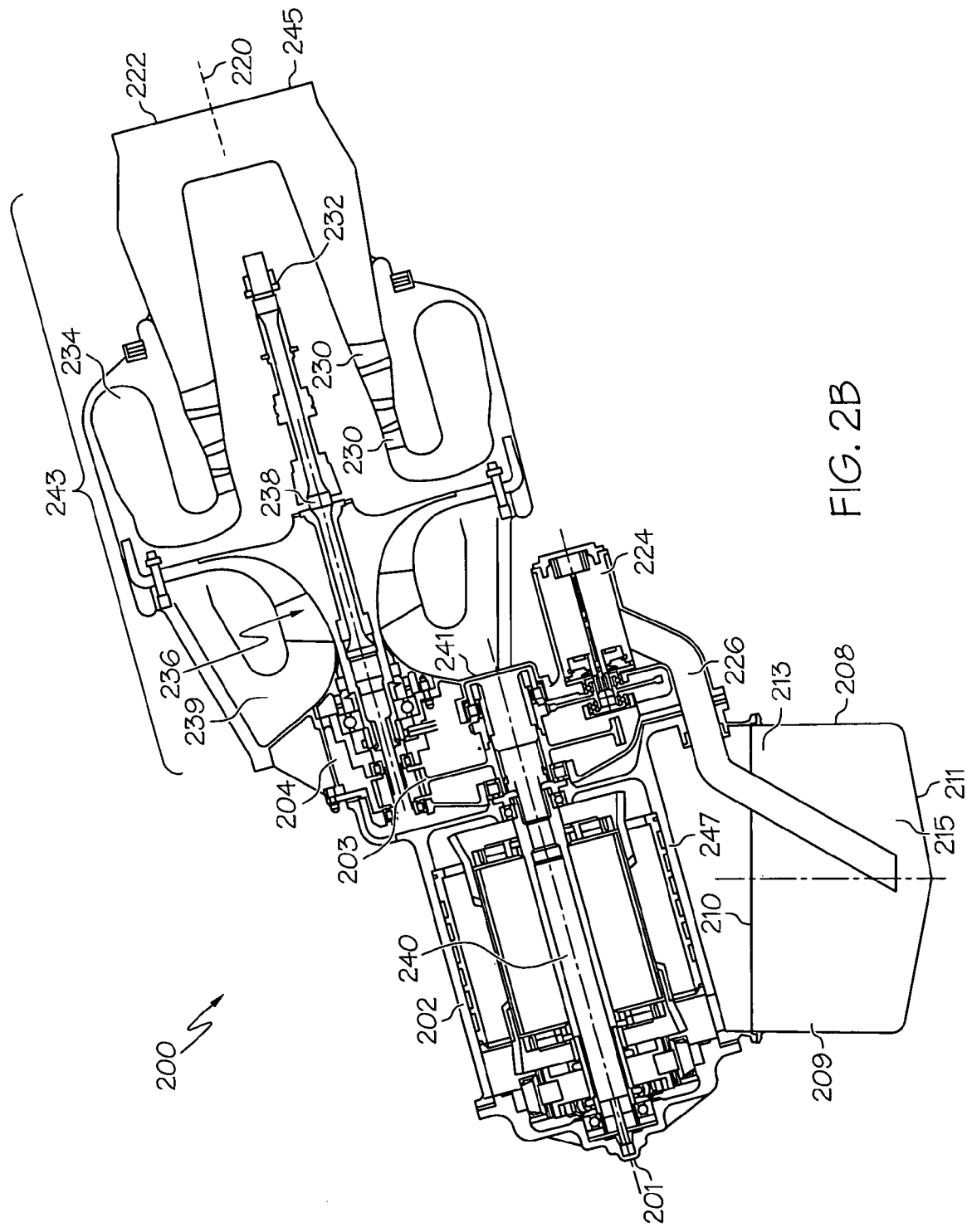
FIG. 2B is a cross-sectional view of an embodiment of an APU of the present invention showing a generator and oil tank assembly.

Referring to FIGS. 2A and 2B, there is shown APU 200, an embodiment of the present invention having oil tank 208 integral with generator 202. Several primary components of APU 200 are shown in FIG. 2B. At a most forward end 201 of APU 200 is generator 202 mounted to gearbox 204. Gearbox 204 may be mounted to a cooler end 241 of a turbine power unit 243 proximate an air inlet 239. Air entering air inlet 239 may enter a compressor 236 and then a combustor 234 where it may be mixed with fuel for combustion. The products of combustion may drive a turbine 230 and exit exhaust 222 at an aft end 245 of APU 200. A drive shaft 238 of turbine 230 may be in mechanical communication with gearbox 204.

APU 200 may have oil cooled generator 202 mounted on the forward side of gearbox 204. Gearbox 204 is advantageously located on the cool end 241 of the power section 243 having compressor 236. Gearbox 204 may reduce the rotational speed of a shaft 238 by gear reduction down to a speed that may be required to properly operate generator 202. APU 200 is shown in a horizontal orientation in FIG. 2A and at a 15° forward end down orientation in FIG. 2B. It is to be understood that APU 200 may be installed into the tailcone section of an aircraft at almost any orientation; however it is advantageously installed in a horizontal or forward end down orientation where gravity scavenging is optimized.

Generator 202 may have integral oil tank 208 extending downward from a lower side 247 thereof. Due to the location of generator 202 on the extreme end and the lower end of APU 200, lubricating and cooling oil pumped to generator 202 and gearbox 204 may be gravity scavenged. This may eliminate the need to provide a pump to scavenge and return oil from generator 202 and gearbox 204 to oil tank 208, however a pump may be provided. Since generator 202 requires a substantial amount of the circulating oil, having oil tank 208 below and integral therewith may provide a simplified and efficient means of gravity scavenging oil from generator 202 and gearbox 204. The large quantity of oil supplied to generator 202 may be gravity scavenged from both ends of a generator rotor 240 and advantageously gearbox 204 and returned to oil tank 202 where it may be collected. Gravity scavenging oil from both ends of generator rotor 240 may prevent oil from being churned by generator rotor 240 in turn reducing the risk of generating excess heat and catastrophic generator 202 failure. Gravity scavenging may be enhanced when APU 200 is mounted within a tailcone in a forward end down angle. Advantageously, APU 200 is mounted in a tailcone of an aircraft with between about a 0° to 25° forward end down angle. Integral oil tank 208 may eliminate the need for the use of separate cored oil passages and pump elements to reduce the risk of oil flooding the ends of generator rotor 240 and generator failure.

Oil tank 208 may have a downwardly extending sidewall 209 integral with generator 202 and a bottom wall 211 opposite an open top 213. Oil may be gravity scavenged into the open top 213 of oil tank 208 where it settles in a lower portion 215 thereof. This configuration may separate the return oil from the gears 203 in the gearbox 204 by a distance sufficient to reduce the risk of oil system contamination if oil cooled generator 202 were to fail mechanically. In the event of a mechanical failure of generator 202, debris may be produced which may settle in the lower portion 215 or on the bottom wall 211 of oil tank 208 and not be churned up by gears 203 in gearbox 204 during extreme flight attitudes. Oil tank 208 may also have oil fill cap 218 about an opening in oil tank 208.

Oil pump 224 is advantageously powered by gearbox 204 and pumps oil from tank 208 to generator 202 and gearbox 204 via an oil tube 226. Oil pump 224 may also pump oil to compressor 236, combustor 234, turbine 230 and other components of APU 200 requiring oil for lubrication or cooling. Additionally, oil pump 224 can scavenge oil from an aft turbine bearing sump 232 and other components of APU 200. Additional or different pumps may be mounted to APU 200 to provide delivery and scavenging of oil to any of the components associated with APU 200.

Figure 3:
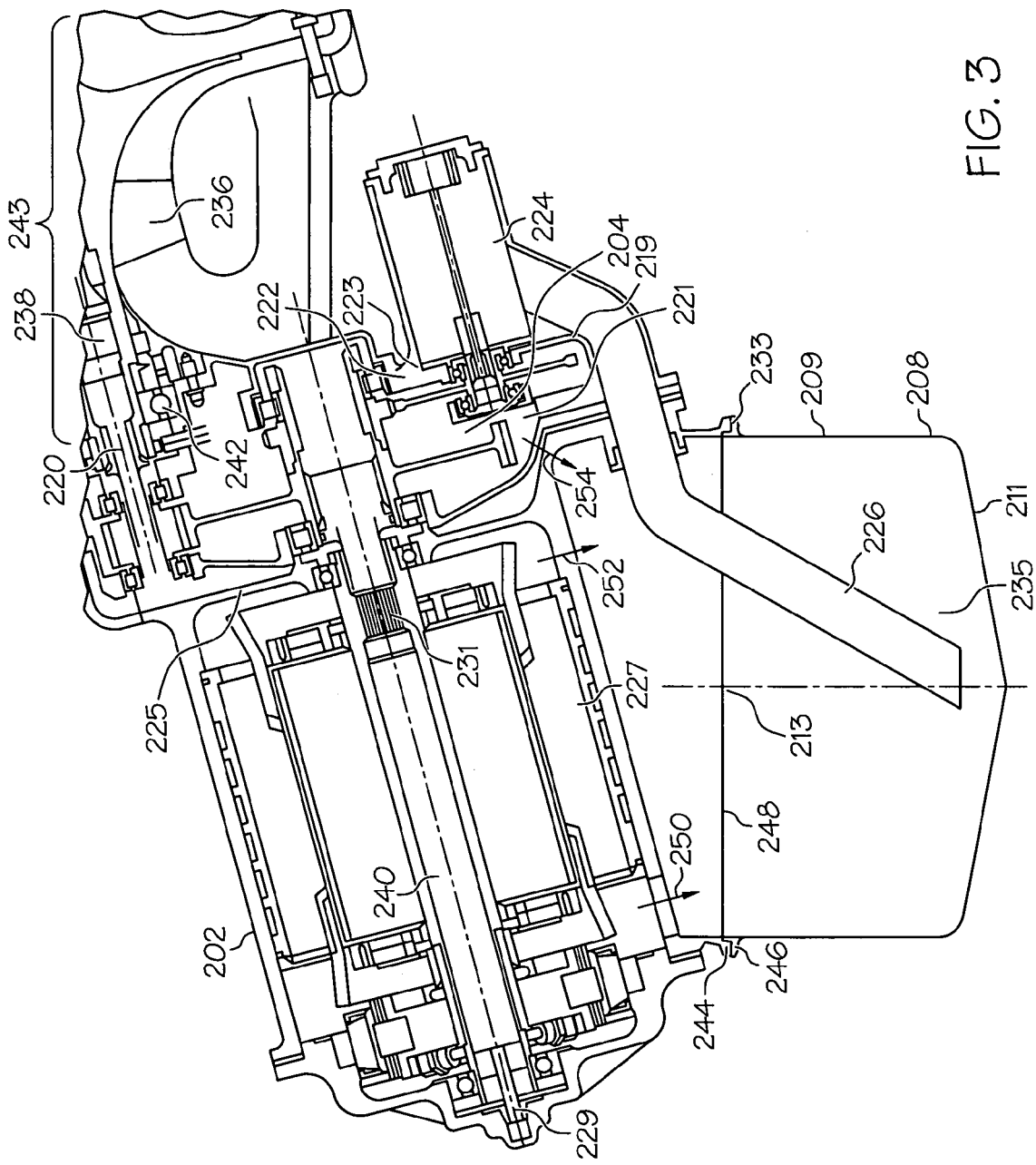
FIG. 3 is a cut-away cross-sectional view of the integral generator and oil tank assembly shown in FIG. 2B showing oil gravity drain passages enabling gravity scavenging of oil from the generator.

FIG. 3 is a cut-away view of APU 200 showing oil gravity drain passages through which oil may be gravity scavenged from generator 202 and gearbox 204. Gearbox 204 may have a lower portion 221, an aft side 219 mounted to a forward side 223 of turbine power unit 243 proximate air compressor 236, and a forward side 225. Gearbox 204 may be suitable for reducing the speed of shaft 238 by gear reduction and has an oil gravity drain passage 254 in a lower portion 221. Engine forward bearing 242 proximate shaft 238 may be in flow communication with oil drain passage 254 enabling gravity scavenging of oil from engine forward bearing 242 through oil drain passage 254.

Oil cooled generator 202 may be mounted proximate a forward side 225 of gearbox 204 and may receive power from gearbox 204 at the reduced shaft speed. Oil cooled generator 202 has oil gravity drain passages 250 and 252 in a lower portion 227 thereof. Oil drain passages 250 and 252 are in flow communication with the forward end 229 and aft end 231 of generator rotor 240, enabling gravity scavenging of oil from each end 229 and 231 of generator rotor 240. Oil tank 208 may have sidewall 209, bottom wall 211, and an open top 213. An upper exterior portion of sidewall 209 may have an outwardly extending flange 246. Lower portion 227 of generator 202 may be bell shaped and may have mating surface 233 with outwardly extending flange 244. Outwardly extending flange 246 on oil tank 208 may be adjacent outwardly extending flange 244, enabling oil tank 208 to be integrated with generator 202. A band clamp 260, shown in FIG. 4B, or other device or material as is known in the art may be used to mount an upper portion of sidewall 209 to a lower portion 227 of generator 202. In this mounted configuration, generator 202 and engine oil tank 208 assembly may have engine oil tank 208 integral with generator 202 where bottom wall 211 is positioned below turbine power unit 243, lower portion 221 of gearbox 204, and lower portion 227 of oil cooled generator 202, enabling oil tank 208 to gravitationally scavenge oil from oil drain passages 250, 252, and 254.

Oil tank 208 may be positioned substantially under the lower portion 227 of generator 202 and is integral therewith. Advantageously, oil tank 208 and generator 202 assembly may have oil tank 208 removable from generator 202. Oil pump 224 may be in flow communication with lower portion 235 of oil tank 208 through oil pickup tube 226. Optionally, screen 248 may be positioned between oil gravity drain passages 250, 252, and 254 and bottom wall 211 of oil tank 208. Screen 248 may be suitable for capturing debris that may be generated in the event of failure of generator 202 or other components of APU 200. Oil tank 208 may be removable allowing for cleaning of oil tank 208 and screen 248 and changing of oil contained therein without the need to remove generator 202 from gearbox 204.

Figure 4B:
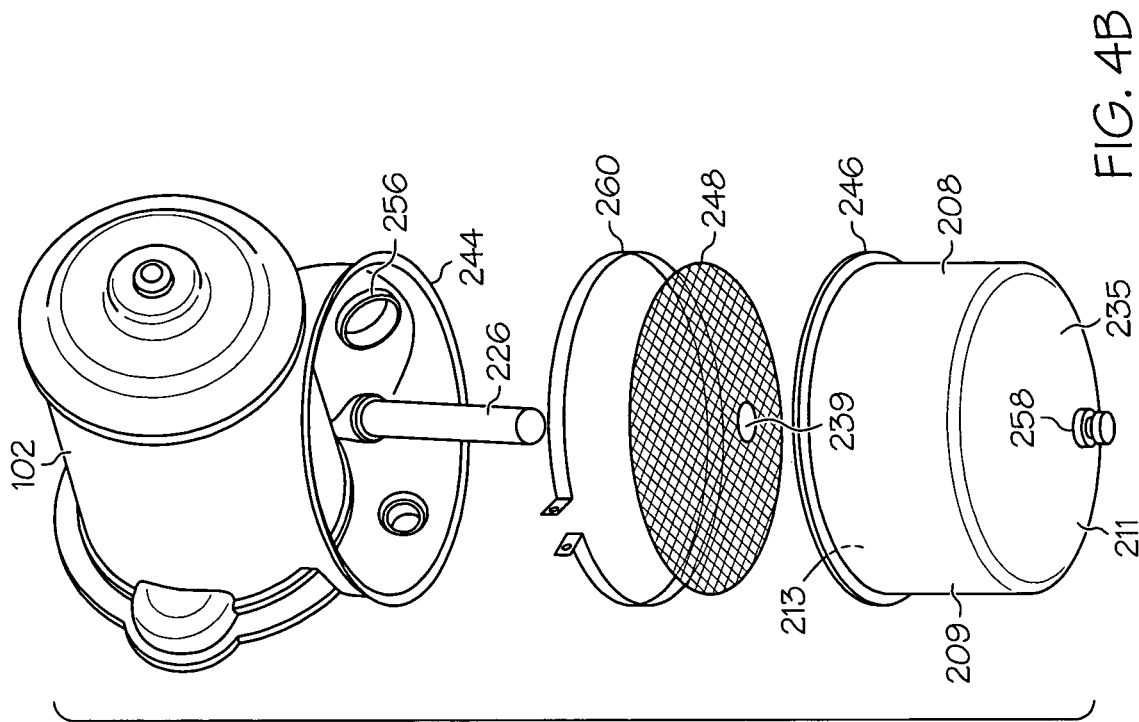
FIG. 4B is an exploded view of an embodiment of an integral generator and oil tank assembly of the present invention showing internal components thereof.
Figure 4A:
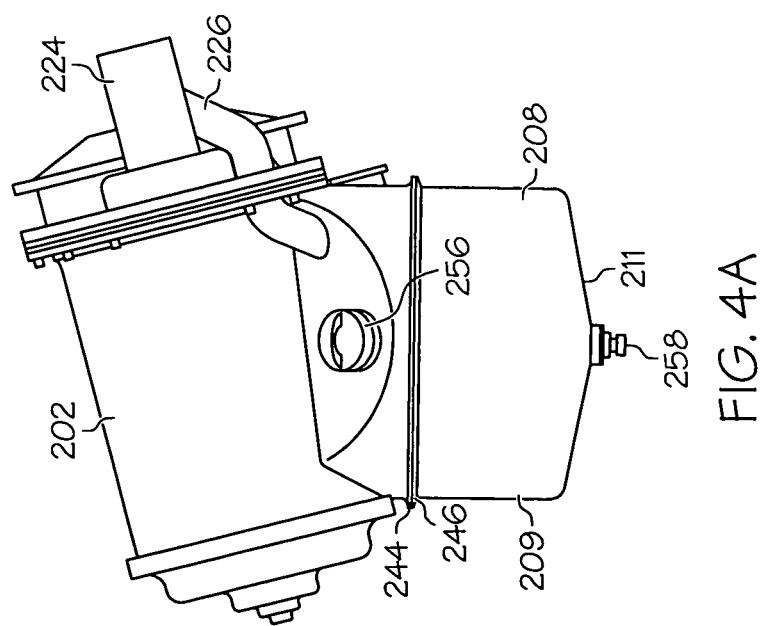
FIG. 4A is a side view of an embodiment of an integral generator and oil tank assembly of the present invention showing external components thereof.

FIGS. 4A and 4B show external and internal components of gravity scavenged generator 202 having integral oil tank 208. Generator 202 may have an open bell shaped lower portion 237 with oil tank fill cap 256 in a side aperture. Removal of oil tank fill cap 256 may provide an opening for filling oil tank 208. About the lower exterior perimeter of open bell shaped lower portion 237 is flange 244. About the upper exterior perimeter of open top 213 of oil tank 208 is flange 246. Clamp 260 may be suitable for extending around flanges 244 and 246 and mounting oil tank 208 to generator 102 making oil tank 208 integral with generator 202. This configuration may provide for the removal of oil tank 208 from generator 202 without the need to remove a gearbox from the APU as may be required in the prior art. Elimination of the need to disassemble the APU to clean oil tank 208 may save maintenance costs.

Optional screen 248 is shown removed from oil tank 208 and generator 202 and having aperture 239 therein for receiving oil pickup tube 226 therethrough. Advantageously, screen 248 is secured proximate clamp 260 for holding debris that may otherwise lower portion 235 of oil tank 208. In the embodiment shown here, oil tank sidewall 209 is cylindrical and extends down from flange 246 to bottom wall 211. Bottom wall 211 slopes to lower portion 235, conical in the embodiment shown, and has oil tank drain plug 258 at the bottom. The rounded configuration of sidewall 209 and bottom wall 211 may provide oil tank 208 with little or no areas within that may tend to stagnate oil circulating therethrough. However, other and different configurations of oil tank 208 may be provided. Advantageously, oil tank 208 is comprised of a lightweight material that does not require fire resistant testing such as thin steel.

It should be understood, of course, that the foregoing relates to exemplary embodiments of the invention and that modifications may be made without departing from the spirit and scope of the invention as set forth in the following claims.

I claim:

1. An auxiliary power unit for an aircraft comprising:
a turbine internal combustion engine having a turbine main shaft and a forward bearing supporting the turbine shaft;
a gearbox with gears connected to be driven by the turbine main shaft, the gearbox including a lower portion;
an oil cooled generator including a rotor forward end, a rotor aft end, and a rotor shaft extending from the rotor aft end to the rotor forward end, the rotor shaft substantially parallel to the turbine main shaft, and connected to be driven by the gears, the oil cooled generator being mounted on the gearbox so that the gearbox is interposed between the generator and the engine, and said oil cooled generator having at least one generator oil gravity drain passage in flow communication with a lower portion thereof;
an oil pump connected to deliver oil to the generator, to the forward bearing, and to the gearbox;
an oil tank including a bottom wall and extending from a lower portion of said generator, the oil tank being in fluid communication with the oil pump and disposed to gravitationally scavenge the oil from said at least one generator oil gravity drain passage in said oil cooled generator;
a gearbox oil gravity drain passage fluidly connecting the engine forward bearing and lower portion of the gearbox with the oil tank to gravitationally scavenge oil into the oil tank from the engine forward bearing and the gearbox;
an oil tube adapted to carry oil from the oil tank to the oil pump; and
a screen disposed in the oil tank, wherein the screen is disposed between an open top end of the oil tank and an inlet of the oil tube, wherein the oil tube passes through an aperture in the screen
and wherein the rotor shaft is angled downwards towards the rotor forward end in relation to the oil tank bottom wall.

2. The auxiliary power unit of claim 1 wherein said oil tank has an attachment flange extending outward from a sidewall.

3. The auxiliary power unit of claim 1 wherein said lower portion of said generator has an open bell shape, a lower exterior perimeter of said open bell shaped lower portion has a flange outwardly extending therefrom.

4. The auxiliary power unit of claim 1 wherein said generator has an oil gravity drain passage in flow communication with the generator rotor forward end, and an oil gravity drain passage in flow communication with the generator rotor aft end.

5. The auxiliary power unit of claim 1 wherein the screen is disposed between said at least one generator oil gravity drain passage and a bottom wall of said oil tank, and the screen is disposed between the gearbox oil gravity drain passage and the bottom wall of the oil tank.

6. The auxiliary power unit of claim 1 wherein said oil tank is removably mounted to said generator.

7. The auxiliary power unit of claim 1 wherein said oil tank is comprised of fire resistant material.

8. The auxiliary power unit of claim 7 wherein said oil tank is comprised of steel.

9. The auxiliary power unit of claim 1 wherein a sidewall of said oil tank is cylindrical.

10. The auxiliary power unit of claim 1 wherein a bottom wall of said oil tank slopes toward a lower portion.

11. The auxiliary power unit of claim 10 wherein said oil tank bottom wall is conical.

12. The auxiliary power unit of claim 1 being installed in the tailcone of an aircraft in a horizontal or forward end angled down orientation, said auxiliary power unit forward end having said generator.

13. An auxiliary power unit comprising:
an oil cooled generator including a rotor forward end, a rotor aft end, and a rotor shaft extending from the rotor aft end to the rotor forward end; and
an oil tank including a bottom wall,
said oil tank extending from a lower portion of said generator wherein the rotor shaft is angled downwards towards the rotor forward end in relation to the oil tank bottom wall,
said generator receiving power from a gearbox of said auxiliary power unit, said generator having oil gravity drain passages in flow communication with each end of a generator rotor,
said oil gravity drain passages being in flow communication with said oil tank,
the gearbox being axially displaced from the oil tank, and
the gearbox having a lower portion with a gearbox lower wall, and a gearbox-gravity drain passage through the gearbox lower wall in flow communication with the oil tank, the gearbox lower wall separating the gearbox from the oil tank.

14. The auxiliary power unit of claim 13 wherein said oil tank is removable from said generator.

15. The auxiliary power unit of claim 13 wherein said generator and oil tank assembly has a screen therein above a bottom wall of said oil tank and below said oil gravity drain passages in said generator.

16. The auxiliary power unit of claim 13 wherein said oil tank has a sidewall extending downward from said generator to a bottom wall, said bottom wall sloping to a lower portion having an oil tank drain plug.

* * * * *